(No Model.) 2 Sheets—Sheet 1.
J. CARTER & W. J. WHITING.
REVOLVER.
No. 432,369. Patented July 15, 1890.
Fig. 1
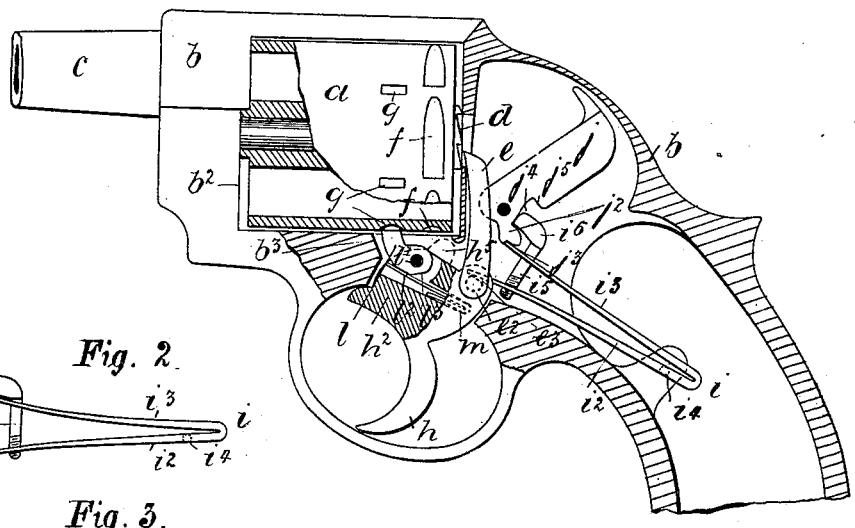
Fig. 2
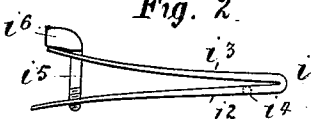
Fig. 3
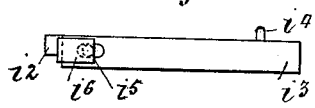
Fig. 4
Fig. 5
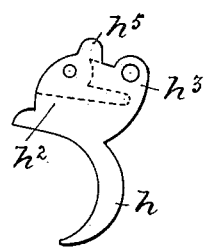
Fig. 6
Fig. 7
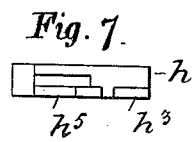
WITNESSES
Henry Skerrett
Miles E. Hughes
Both of Birmingham
INVENTORS
John Carter
William John Whiting
Connod Bros Attys (No Model.) 2 Sheets—Sheet 2.
J. CARTER & W. J. WHITING.
REVOLVER.
No. 432,369. Patented July 15, 1890.
Fig. 8.
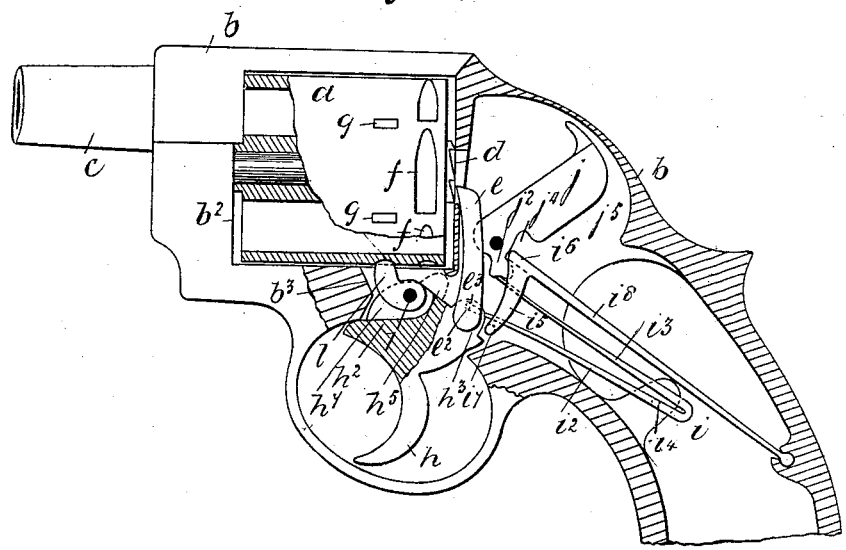
Fig. 11. Fig. 9.
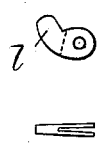 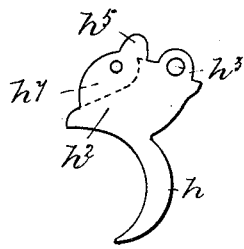
Fig. 10.
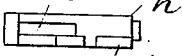
Fig. 12.
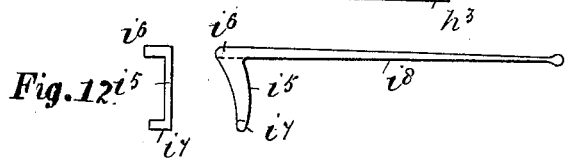
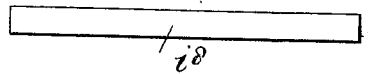
WITNESSES
Henry Skerrett
Miles E. Hughes
Both of Birmingham.
INVENTORS
John Carter
William John Whiting
Connell, Bros Attys

UNITED STATES PATENT OFFICE.

JOHN CARTER AND WILLIAM JOHN WHITING, OF BIRMINGHAM, ENGLAND, ASSIGNORS TO THOMAS WILLIAM WEBLEY AND HENRY WEBLEY, OF SAME PLACE.

REVOLVER.

SPECIFICATION forming part of Letters Patent No. 432,369, dated July 15, 1890.

Application filed March 14, 1889. Serial No. 303,311. (No model.) Patented in England April 18, 1888, No. 5,778, and in Belgium January 31, 1889, No. 63,294.

*To all whom it may concern:*

Be it known that we, JOHN CARTER and WILLIAM JOHN WHITING, pistol-action filers, subjects of the Queen of Great Britain, and residing at Bracebridge Street, Aston juxta, Birmingham, England, have invented certain new and useful Improvements in Revolvers and other Repeater Small-Arms, (for which applications have been made in Great Britain, dated the 18th day of April, 1888, No. 5,778, and in Belgium, dated the 31st day of January, 1889, initial No. 63,294;) and we do hereby declare the following to be a full, clear, and exact description of the invention, reference being had to the accompanying drawings, which form part of this specification.

This invention relates to revolvers and other like repeater small-arms, as hereinafter described.

Figure 1 represents, partly in vertical section and partly in elevation, a solid-frame concealed-hammer revolver with a free moving cylinder constructed and arranged according to our invention. Fig. 2 is a front elevation of the spring and stay. Fig. 3 is a plan view of the same. Fig. 4 is an elevation, and Fig. 5 is a plan view, of the second cylinder-stop. Fig. 6 is a side view of the trigger, and Fig. 7 a top view of the same. Fig. 8 is a side view, partially in section, of a modified construction of fire-arms embodying our invention. Fig. 9 is a side view of the trigger. Fig. 10 is a top view of the same. Fig. 11 is a side view of the second cylinder-stop, and Fig. 11$^a$ a plan view of the same. Fig. 12 is an end view, Fig. 13 a side view, and Fig. 14 a top view, of the stay.

$a$ is a chambered and free-working cylinder turning upon a central axis and moving within the rectangular-shaped recess $b^2$ of the solid frame $b$, whose stock, furniture, and trigger-guard are made in one piece with it, while the fore part carries a barrel $c$, whose bore becomes coincident with the chambers of the free cylinder when the same is rotated for the bringing of its chambers into position for firing. The chambered cylinder has a centrally-disposed ratchet-faced annulus $d$ at the middle of its rear end, and with the teeth of which said annulus the upper end of a lifter $e$ engages.

The cylinder $a$ has double-stop recesses $f$ $g$, with which cylinder-stops $h^5$ $l$ engage. The stop $h^5$ is an upper extension of the trigger-blade $h^2$ of the trigger $h$, while the stop $l$, which is an upwardly-directed arm, turns upon a pivot or axis $l'$, common to both stop and trigger. The under side of the stop $l$ has facets or flats $l^2$ $l^3$, upon which the free end of a spring $m$ takes its bearing.

The lifter $e$ is jointedly connected to the rear top side $h^3$ of the trigger-blade $h^2$ by an outstanding arm $e^2$, with a flat $e^3$ at its top side, upon which the free end of the stand-side limb of the mainspring takes its bearing.

The mainspring, which is marked $i$, has a threaded stay $i^5$, with its lower shank end fixedly secured to the stand-side limb $i^2$, while the upper end of the said shank passes loosely through an eye $i^7$ near the end of the top limb $i^3$ of the said spring. The upper end of the said stay has a head $i^6$, which works within a gap $j^4$ at the rear lower side of the hammer $j$, whose extreme lower part has a heel or short arm $j^2$, with a bent or notch $j^3$ made in its under side, and wherein the extreme free end of the limb $i^3$ of the spring $i$ engages when the hammer is at cock, and upon the under side of which said heel the free end of the spring presses rearwardly of the joint for throwing the hammer forward on the discharge of the arm. The stem of the stay $i^5$ works freely, as aforesaid, through a hole in the top limb, so that on the lower limb, which rests upon the flat $e^3$ of the arm $e^2$ of the lifter $e$, rising by the upward movement of the trigger-blade the stay which is carried by the limb of the spring moves with it.

The action of the arm is as follows: The pulling of the trigger turns it rearward upon its pivot or center and takes the second cylinder-stop $l$ from out of the second cylinder-stop recess $g$, and also raises the lifter $e$, which turns the cylinder round upon its axis to the extent of a chamber, and with the bore of the said chamber coincident with that of the barrel, and when in this position—viz., ready for firing—the first cylinder-stop $h^5$ has passed into a first cylinder-stop recess $f$, and the second cylinder-stop $l$ has fled back (as hereinafter described) into the second cylinder-stop recess $f g$, so that the cylinder is held at two points during firing. From this it will be seen that the cylinder during firing is held at two points and at other positions (save when rotating) at one, and the holding at one point is to prevent the cylinder rotating by itself or without action when a portion of the chambers are discharged. Thus the pulling of the trigger takes the No. 1 cylinder-stop from its recess, (which flies back again after a certain movement,) raises the lifter, and takes the other cylinder-stop into its recess after the lifter has turned the cylinder to the desired extent, and, further, the lifter in rising causes its arm $e^2$ to compress and lift the lower limb $i^2$ of the spring $i$, and so thereby elevate the stay $i^5$, so as to bring the head $i^6$ thereof upon the top side or shoulder $j^5$ of the recess $j^4$ of the hammer $j$, and there exert pressure upon the back of the hammer, which levers the extreme end of the limb $i^3$ from out of the bent $j^3$ of the arm $j^2$ and brings the full force of the spring upon the heel or arm rear of the joint-pin, which throws the hammer, strikes the detonate of the cartridge, and then rebounds on pressure being relieved from the said trigger. The rebounding of the hammer is effected by the trigger resuming its normal position by the spring's pressure exerted upon it, which causes the head of the stay, which is drawn downward, to be brought upon the top side of the heel or arm $j^2$, so as to turn the hammer back to cock, which is caught and retained there by the end of the spring which engages with the bent.

The following is a further elucidation of the action of the cylinder-stops: The function of the stops is to hold the cylinders at two points and at one point on the return of the trigger. The No. 2 stop consists of a jointed limb $l$, turning upon the same pin as the trigger and with an abutment $b^3$, against which it comes and rests on the first pulling of the trigger, and from which it again recedes to its normal position within the No. 2 cylinder-stop recess on the said trigger being fully pulled home. The under side of the stop has flats $l^2 l^3$, upon which the free end of a spring $m$ respectively takes on the trigger changing its position. Thus the initial pulling of the trigger carries the stop $l$ with it until its curved front part rests against the abutment $b^3$, when the continued movement of the trigger and spring takes the free end of the said spring from the flat $l'$ to the flat $l^2$, which thereby causes the stop to fly back into its original position; and, further, the return of the trigger on pressure being relieved from it allows the trigger to be returned to its normal position and the spring to again take upon the flat $l'$ of the stop $l$, as represented in Fig. 1.

$a$ is the free-moving cylinder, turning upon a pivot-axis and working within a rectangular-shaped recess or opening $b^2$ of a solid frame $b$, whose rear body part is gapped and wherethrough the upper end of the lifter $e$ works and presses the cylinder round for bringing the respective chambers coincident with the bore of the barrel, as aforesaid. The lifter's lower end is jointedly connected to the rear top side $h^3$ of the trigger-blade $h^2$, as before, by the arm $e^2$, while the stay $i^5$ is hooked at its lower end and marked $i^7$, and upon which hooked part the free end of the stand-side limb $i^2$ of the mainspring $i$ rests, so that the turning rearwardly of the trigger by pulling the shoulder $h^6$ thereof presses upward the said spring-limb and stay together, which causes the head $i^6$ to come against the shoulder $j^5$ of the gap $j^4$ of the hammer $j$, as before. The stay $i^5$ has an inflexible rod $i^8$ for the keeping of the same in position.

The pulling of the trigger raises the lifter, takes the stop $l$ out of the stop-recess $g$ and the stop $h^5$ into the stop-recess $f$, lifts the stay $i^5$, and compresses the spring $i$, causes the head of the stay to press itself upon the rear of the hammer, so as to lever the end of the top side limb out of the bent, which when relieved causes the hammer to fall. The releasing of the trigger allows the parts to resume their normal positions and the stop $l$ to again pass into its cylinder-stop recess $g$. Thus the cylinder-recess stop $l$ is forked at its lower end and adapted to bind within a recess $h^7$ of the trigger-blade, so that on the trigger being pulled this said stop is taken out of the cylinder-recess $g$, and on coming against the abutment $b^3$ it is there retained until the return of the trigger, when they both again move together.

In this modification the arm on firing is only held by one cylinder-stop—viz., $h^5$—and when in its normal position, as in Fig. 8, it is held by the second cylinder-stop $l$. Thus it will be observed that the said cylinder-stop $l$ is carried to and fro by its forked parts binding within the recess $h^6$ of the trigger.

Having thus described our invention, we claim as new and desire to secure by Letters Patent—

1. In a concealed-hammer revolver, the combination, with the frame-abutment $b^3$ and a cylinder having two series of stop-recesses $f g$, of a trigger $h$, provided with stops $h^5 l$, and spring, said stop $l$ being pivotally secured to said trigger and formed with facets $l^2 l^3$, whereby said cylinder is held at two points by the stops $h^5 l$ when the arm is being fired and but at one point when the trigger is normal.

2. In a concealed-hammer revolver, the combination, with the cylinder, hammer, and trigger, and the operating mechanism thereof, including the mainspring $i$, pivoted by one of its leaves to the frame of the revolver, of a hook-headed stay $i^5 i^6$, located at the back of the hammer, secured to the lower leaf of the mainspring, and constructed and adapted to force the free end of the spring from the bent on the lower end of the hammer and to throw the hammer forward, substantially as described.

3. In a concealed-hammer revolver, the combination, with the cylinder, trigger, and mainspring, the latter being pivoted to the frame of the revolver, of the hammer $j$, having arm $j^3$ and gap $j^4$, and the stay $i^5\ i^6$, attached to the lower leaf of said spring and engaging with said hammer, substantially as described.

4. In a concealed-hammer revolver, the combination, with the cylinder, trigger, hammer, and mainspring, the latter being pivoted by one of its leaves to the frame of the revolver, of the stay $i^5\ i^6$, attached to the lower leaf of the mainspring and engaging with the hammer, substantially as described.

In testimony that we claim the foregoing we have hereunto set our hands.

JOHN CARTER.
WILLIAM JOHN WHITING.

Witnesses:
HENRY SKERRITT,
MILES E. HUGHES,
*Both of Birmingham.*